(12) United States Patent
Kishi et al.

(10) Patent No.: US 11,182,358 B2
(45) Date of Patent: Nov. 23, 2021

(54) PERFORMANCE ENHANCED DATA SCRUBBING

(71) Applicant: International Business Machines Corporation, Armonk, NY (US)

(72) Inventors: Gregory Kishi, Oro Valley, AZ (US); Itzhack Goldberg, Haifa (IL); Daniel I. Tan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 16/515,971

(22) Filed: Jul. 18, 2019

(65) Prior Publication Data

US 2021/0019293 A1 Jan. 21, 2021

(51) Int. Cl.
*G06F 16/00* (2019.01)
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 6,349,390 B1 * | 2/2002 | Dell | G06F 11/106 714/6.24 |
| 7,017,107 B2 | 3/2006 | Talagala et al. | |
| 7,080,200 B2 | 7/2006 | Hassner et al. | |
| 7,137,038 B2 | 11/2006 | New et al. | |
| 7,173,852 B2 | 2/2007 | Gorobets et al. | |
| 8,589,726 B2 | 11/2013 | Kopylovitz | |

FOREIGN PATENT DOCUMENTS

WO 2014089311 A2 6/2014

OTHER PUBLICATIONS

Schwarz et al., "Disk Scrubbing in Large Archival Storage Systems," Proceedings of the 12th IEEE/ACM International Symposium on Modeling, Analysis, and Simulation of Computer and Telecommunication Systems (MASCOTS 2004), Oct. 2004, 10 pages.

(Continued)

*Primary Examiner* — Bai D Vu
(74) *Attorney, Agent, or Firm* — Zilka-Kotab, P.C.

(57) ABSTRACT

A controller-implemented method includes reading, by a controller, a scrub unit containing a read unit and, in response to determining that the scrub unit is not marked as being scrubbed in a current scrub cycle, storing, by the controller, the scrub unit to a memory. The method also includes marking, by the controller, another scrub unit associated with the stored scrub unit as a scrub-pending scrub unit and reading, by the controller, the scrub-pending scrub unit in response to determining that a subsequent read matches predefined criteria. The method includes performing, by the controller, a scrub using the stored scrub unit and the scrub-pending scrub unit. A system includes a processor and logic integrated with the processor, executable by the processor, or integrated with and executable by the processor. The logic is configured to perform the foregoing method.

20 Claims, 8 Drawing Sheets

(56) References Cited

OTHER PUBLICATIONS

Reclaime, "RAID Levels," Raid-calulator.com, accessed on Jul. 16, 2019, 6 pages, retrieved from http://www.raid-calculator.com/raid-types-reference.aspx.

Lamonte, T., "Let your data shine: What is data scrubbing?" GetApp, Nov. 13, 2018, 9 pages, retrieved from https://lab.getapp.com/what-is-data-scrubbing/.

Wikipedia, "Data scrubbing," Wikipedia, Mar. 24, 2019, 4 pages, retrieved from https://en.wikipedia.org/wiki/Data_scrubbing.

* cited by examiner

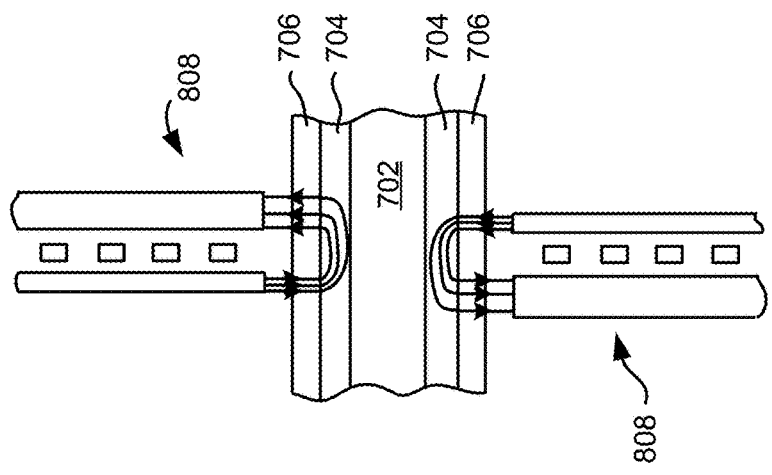
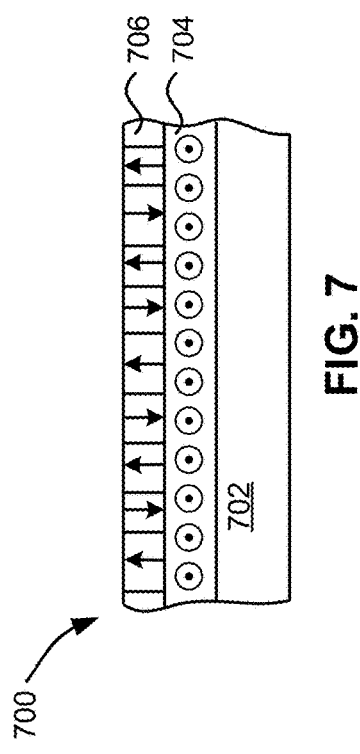
FIG. 7
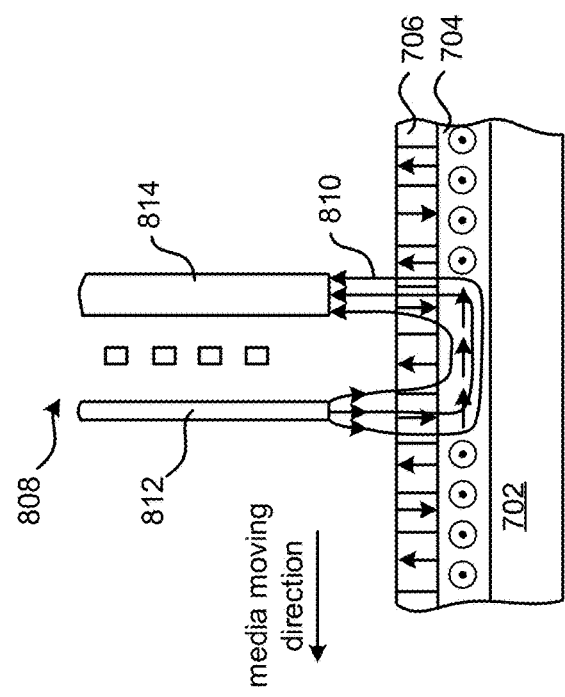
FIG. 8A
FIG. 8B

PERFORMANCE ENHANCED DATA SCRUBBING

BACKGROUND

The present invention relates to data scrubbing, and more specifically, this invention relates to data scrubbing enhancement.

Data scrubbing is an error correction technique. Data scrubbing is conventionally a background task which inspects data for errors and corrects the detected errors using redundant data. The redundant data may be in the form of checksums, data copies, etc. Data scrubbing tools reduce the amount of accumulated errors and reduce the risk of uncorrectable errors which may lead to hardware and/or software failure. Various data scrubbing tools routinely check for errors in the data to prevent hardware and/or software failure. Data scrubbing features conventionally occur in memory, disk arrays, file systems, field-programmable gate array (FPGA), etc.

Data scrubbing includes amending and/or removing data in a database that may be incorrect, incomplete, improperly formatted, duplicated, etc. Conventional data scrubbing includes analyzing data using rules, algorithm, look-up tables, etc. Maintaining data integrity is a continuing goal in data storage system technology; especially with respect to writing, reading, storage, transmission, and processing computer data in computer operation systems, computer storage, data transmission systems, etc.

SUMMARY

A controller-implemented method, according to one embodiment, includes reading, by a controller, a scrub unit containing a read unit and, in response to determining that the scrub unit is not marked as being scrubbed in a current scrub cycle, storing, by the controller, the scrub unit to a memory. The method also includes marking, by the controller, another scrub unit associated with the stored scrub unit as a scrub-pending scrub unit and reading, by the controller, the scrub-pending scrub unit in response to determining that a subsequent read matches predefined criteria. The method includes performing, by the controller, a scrub using the stored scrub unit and the scrub-pending scrub unit.

A system, according to one embodiment, includes a processor and logic integrated with the processor, executable by the processor, or integrated with and executable by the processor. The logic is configured to perform the foregoing method.

A computer program product for data scrubbing, according to one embodiment, includes a computer readable storage medium having program instructions embodied therewith. The program instructions are executable by a computer to cause the computer to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 is partial cross-sectional view of a magnetic disk, in accordance with one embodiment of the present invention.

FIG. 8A is partial cross-sectional view of magnetic head writing to the magnetic disk of FIG. 7, in accordance with one embodiment of the present invention.

FIG. 8B is partial cross-sectional view of magnetic head writing to a two-sided magnetic disk, in accordance with one embodiment of the present invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for data scrubbing enhancement.

In one general embodiment, a controller-implemented method includes reading, by a controller, a scrub unit containing a read unit and, in response to determining that the scrub unit is not marked as being scrubbed in a current scrub cycle, storing, by the controller, the scrub unit to a memory. The method also includes marking, by the controller, another scrub unit associated with the stored scrub unit as a scrub-pending scrub unit and reading, by the controller, the scrub-pending scrub unit in response to determining that a subsequent read matches predefined criteria. The method includes performing, by the controller, a scrub using the stored scrub unit and the scrub-pending scrub unit.

In another general embodiment, a system includes a processor and logic integrated with the processor, executable by the processor, or integrated with and executable by the processor. The logic is configured to perform the foregoing method.

In another general embodiment, a computer program product for data scrubbing includes a computer readable storage medium having program instructions embodied therewith. The program instructions are executable by a computer to cause the computer to perform the foregoing method.

Figure 1:
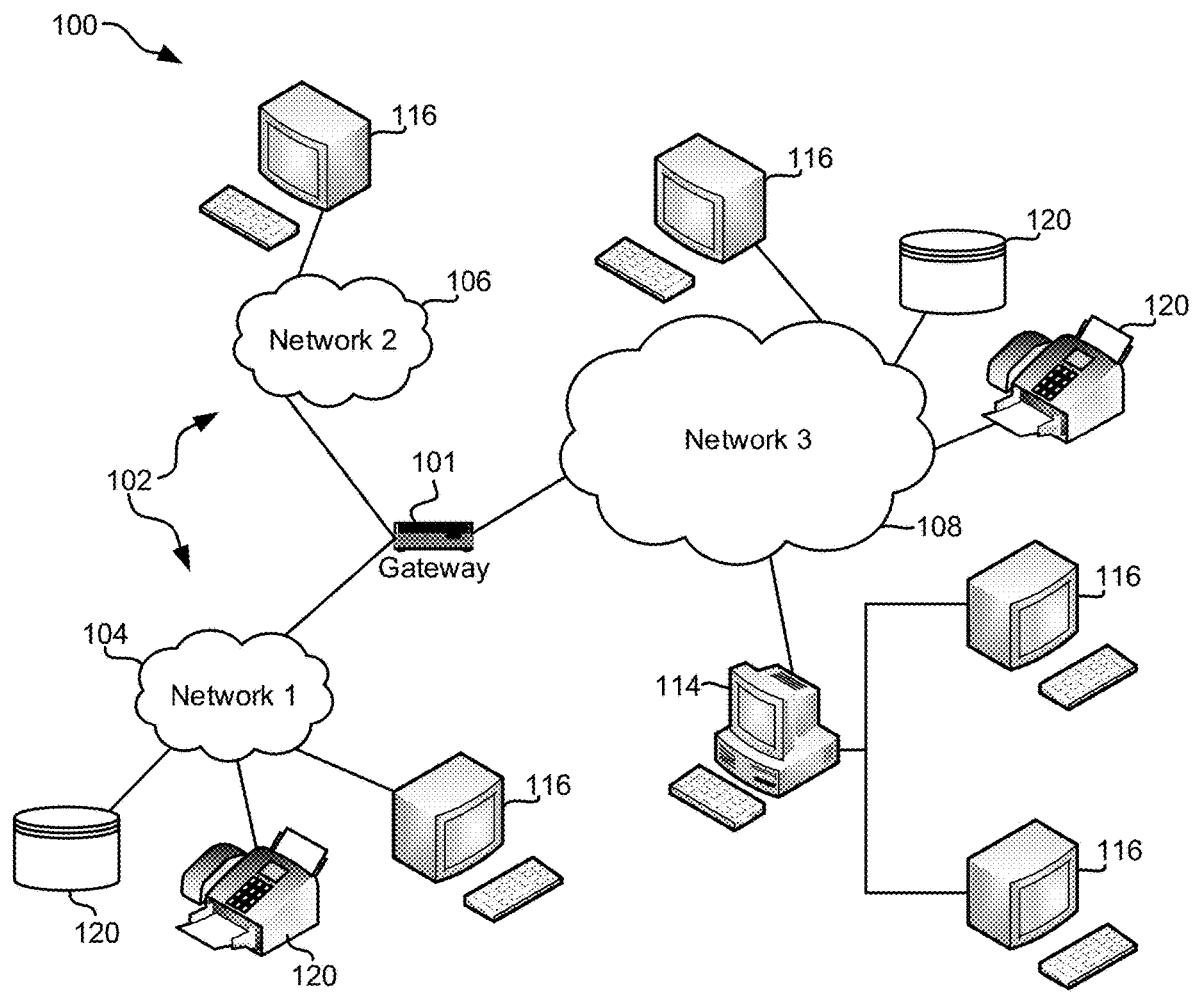
FIG. 1 illustrates a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
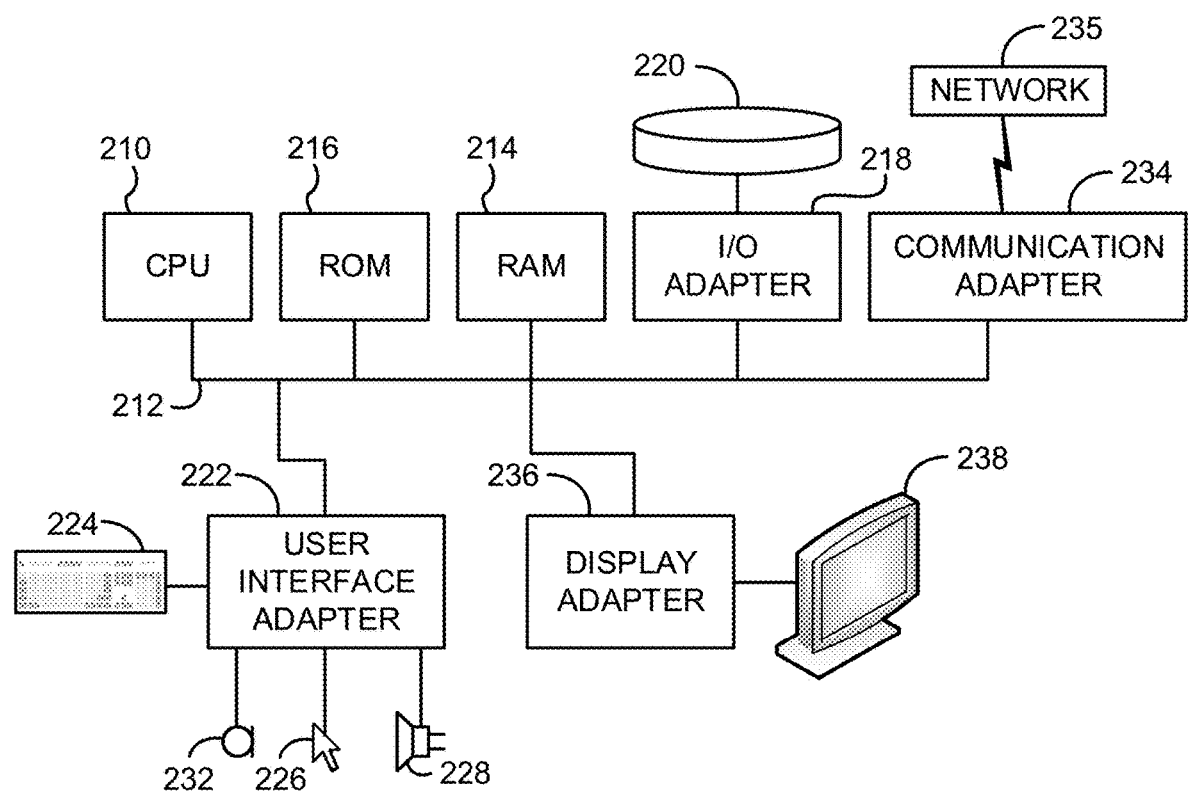
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
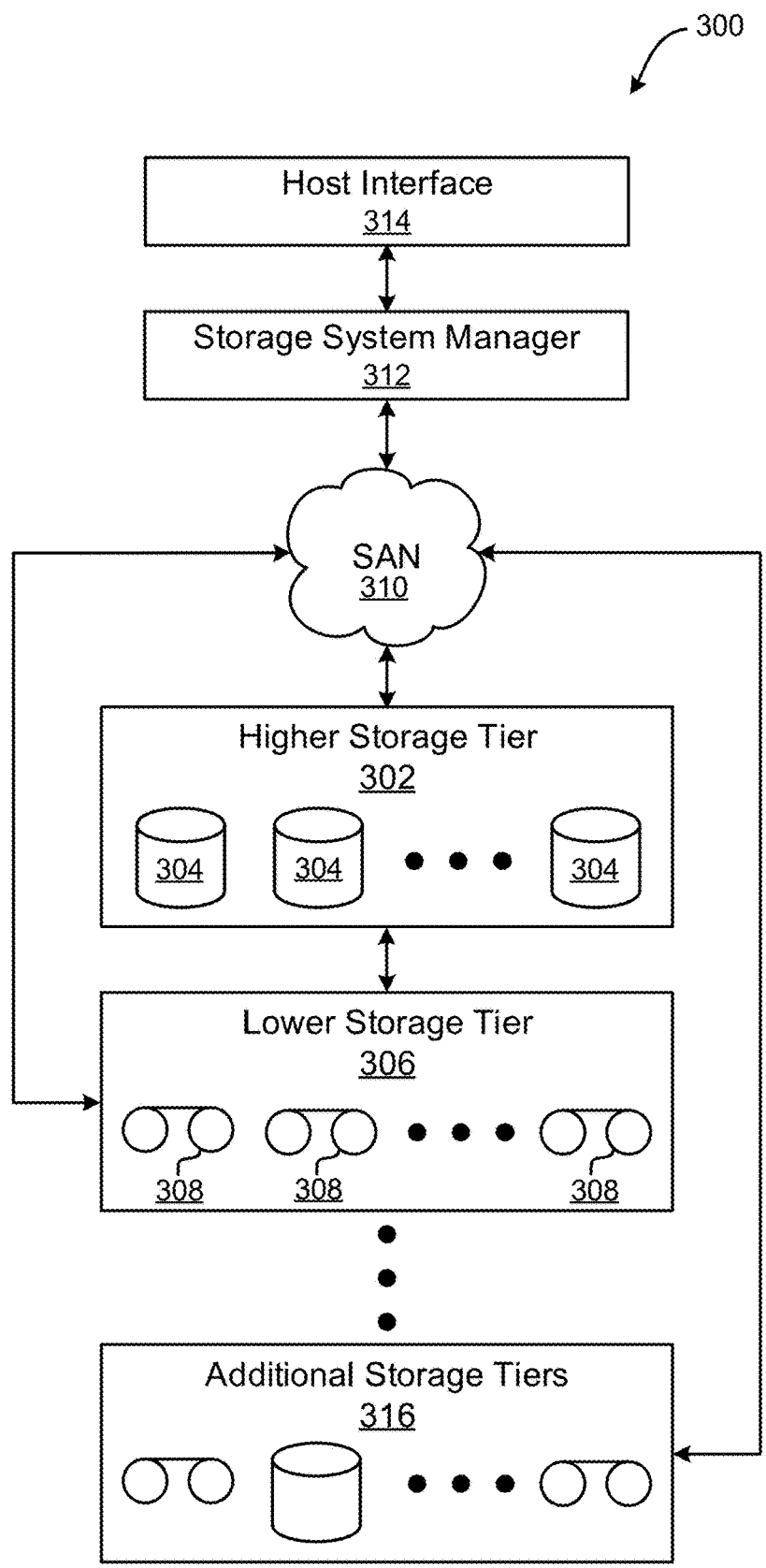
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
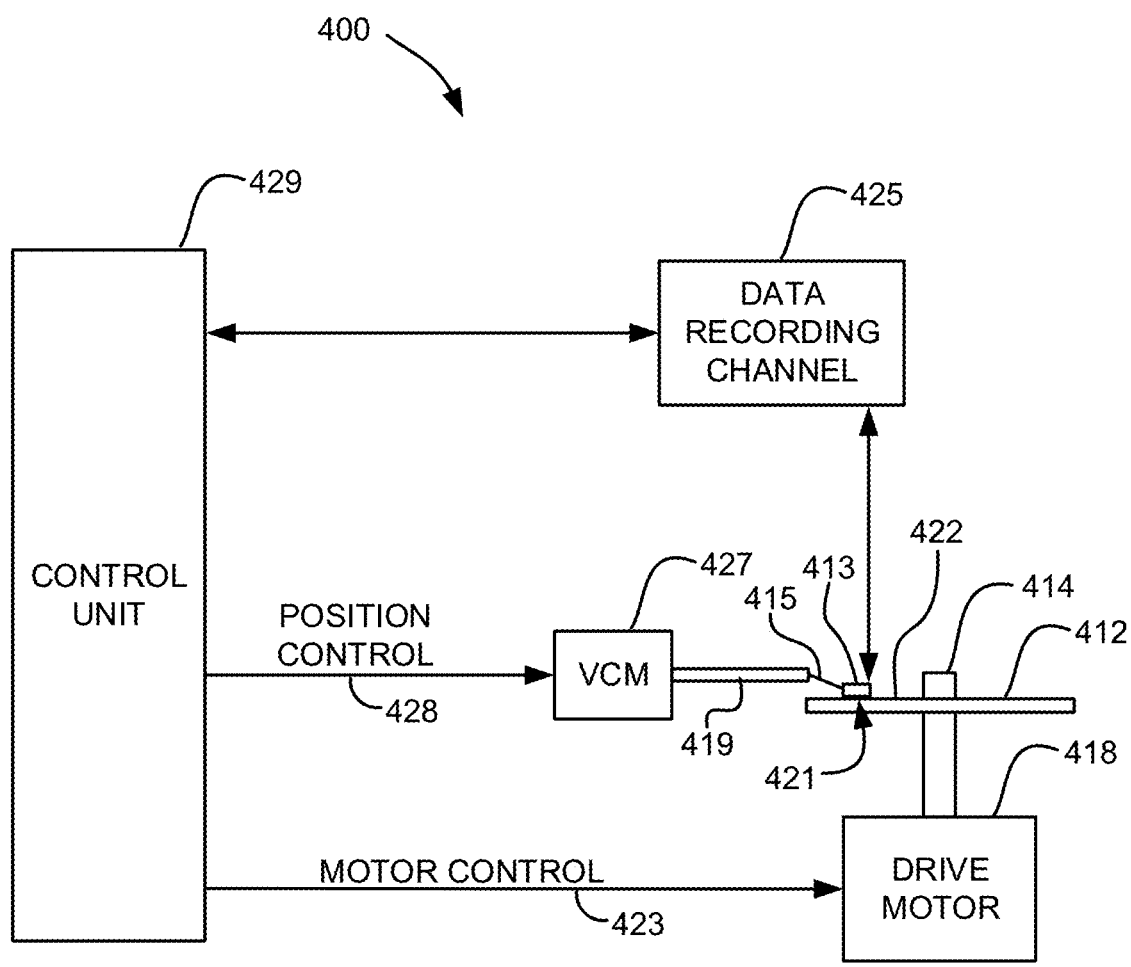
FIG. 4 is a simplified drawing of a magnetic recording disk drive system, in accordance with one embodiment of the present invention.

Referring now to FIG. 4, there is shown a disk drive 400 in accordance with one embodiment of the present invention. As shown in FIG. 4, at least one rotatable magnetic medium (e.g., magnetic disk) 412 is supported on a spindle 414 and rotated by a drive mechanism, which may include a disk drive motor 418. The magnetic recording on each disk is typically in the form of an annular pattern of concentric data tracks (not shown) on the disk 412. Thus, the disk drive motor 418 preferably passes the magnetic disk 412 over the magnetic read/write portions 421, described immediately below.

At least one slider 413 is positioned near the disk 412, each slider 413 supporting one or more magnetic read/write portions 421, e.g., of a magnetic head according to any of the approaches described and/or suggested herein. As the disk rotates, slider 413 is moved radially in and out over disk surface 422 so that portions 421 may access different tracks of the disk where desired data are recorded and/or to be written. Each slider 413 is attached to an actuator arm 419 by means of a suspension 415. The suspension 415 provides a slight spring force which biases slider 413 against the disk surface 422. Each actuator arm 419 is attached to an actuator 427. The actuator 427 as shown in FIG. 4 may be a voice coil motor (VCM). The VCM comprises a coil movable within a fixed magnetic field, the direction and speed of the coil movements being controlled by the motor current signals supplied by controller 429.

During operation of the disk storage system, the rotation of disk 412 generates an air bearing between slider 413 and disk surface 422 which exerts an upward force or lift on the slider. The air bearing thus counter-balances the slight spring force of suspension 415 and supports slider 413 off and slightly above the disk surface by a small, substantially constant spacing during normal operation. Note that in some embodiments, the slider 413 may slide along the disk surface 422.

The various components of the disk storage system are controlled in operation by control signals generated by controller 429, such as access control signals and internal clock signals. Typically, control unit 429 comprises logic control circuits, storage (e.g., memory), and a microprocessor. In a preferred approach, the control unit 429 is electrically coupled (e.g., via wire, cable, line, etc.) to the one or more magnetic read/write portions 421, for controlling operation thereof. The control unit 429 generates control signals to control various system operations such as drive motor control signals on line 423 and head position and seek control signals on line 428. The control signals on line 428 provide the desired current profiles to optimally move and position slider 413 to the desired data track on disk 412. Read and write signals are communicated to and from read/write portions 421 by way of recording channel 425.

The above description of a magnetic disk storage system, and the accompanying illustration of FIG. 4 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Regarding a magnetic head, an inductive write portion therein includes a coil layer embedded in one or more insulation layers (insulation stack), the insulation stack being located between first and second pole piece layers. A gap may be formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 5A:
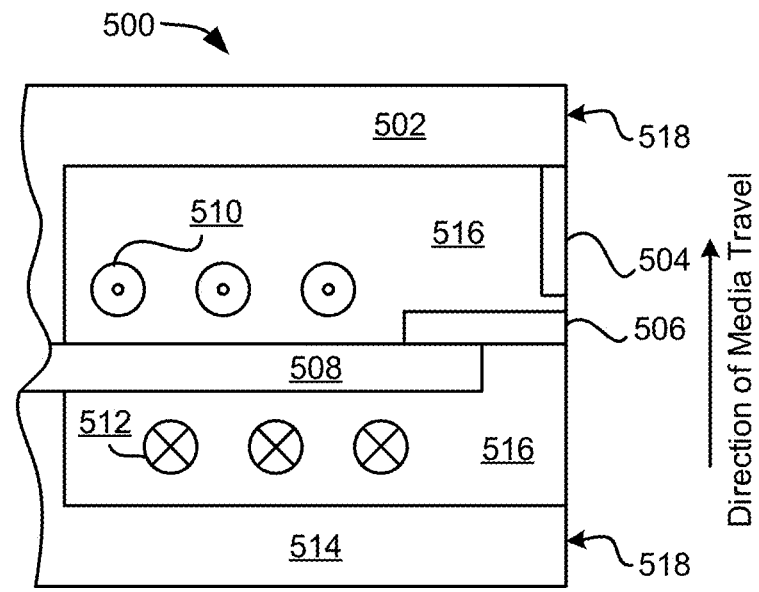
FIG. 5A is a cross-sectional view of a perpendicular magnetic head with helical coils, in accordance with one embodiment of the present invention.

FIG. 5A is a cross-sectional view of a perpendicular magnetic head 500, according to one embodiment. In FIG. 5A, helical coils 510 and 512 are used to create magnetic flux in the stitch pole 508, which then delivers that flux to the main pole 506. Coils 510 indicate coils extending out from the page, while coils 512 indicate coils extending into the page. Stitch pole 508 may be recessed from the ABS 518.

Insulation 516 surrounds the coils and may provide support for some of the elements. The direction of the media travel, as indicated by the arrow to the right of the structure, moves the media past the lower return pole 502 first, then past the stitch pole 508, main pole 506, trailing shield 504 which may be connected to the wrap around shield (not shown), and finally past the upper return pole 502. Each of these components may have a portion in contact with the ABS 518. The ABS 518 is indicated across the right side of the structure.

Perpendicular writing is achieved by forcing flux through the stitch pole 508 into the main pole 506 and then to the surface of the disk positioned towards the ABS 518.

Figure 5B:
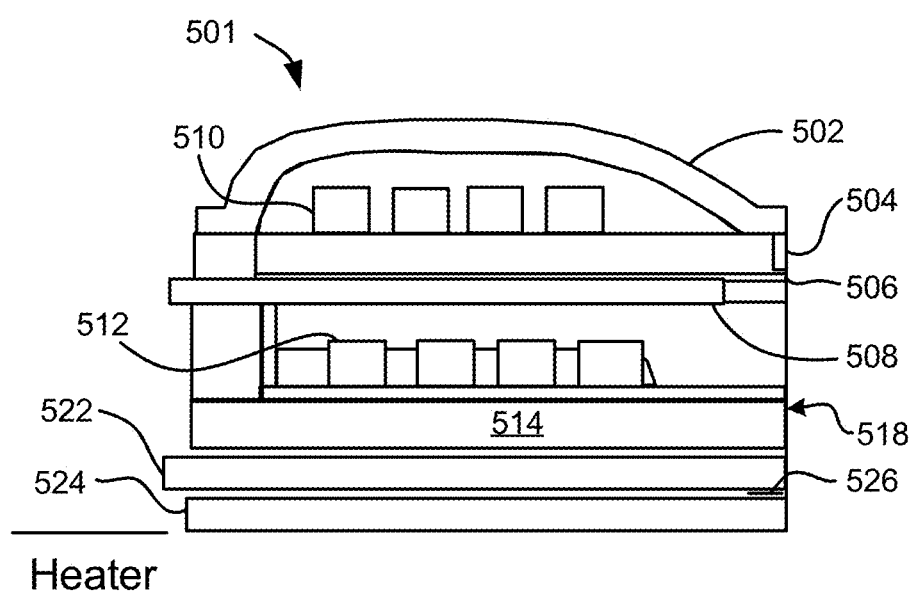
FIG. 5B is a cross-sectional view of a piggyback magnetic head with helical coils, in accordance with one embodiment of the present invention.

FIG. 5B illustrates one embodiment of a piggyback magnetic head 501 having similar features to the head 500 of FIG. 5A. As shown in FIG. 5B, two shields 504, 514 flank the stitch pole 508 and main pole 506. Also sensor shields 522, 524 are shown. The sensor 526 is typically positioned between the sensor shields 522, 524.

Figure 6A:
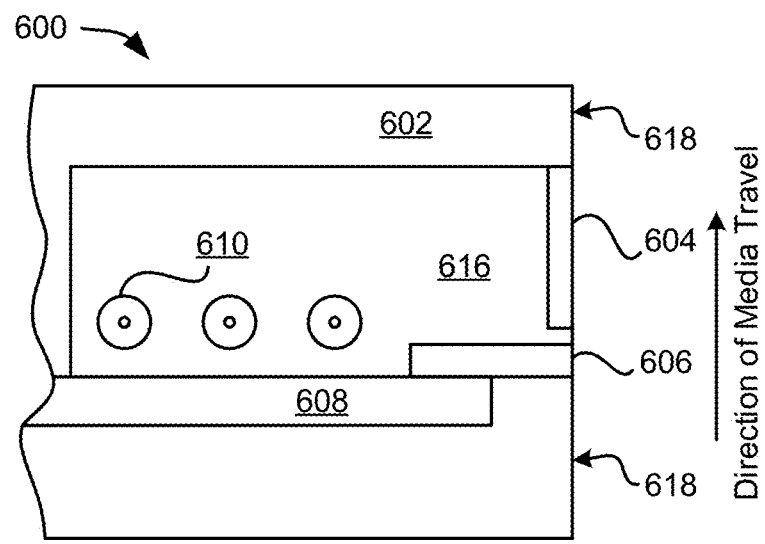
FIG. 6A is a partial cross-sectional view of a perpendicular magnetic head with looped coils, in accordance with one embodiment of the present invention.

FIG. 6A is a schematic diagram of another embodiment of a perpendicular magnetic head 600, which uses looped coils 610 to provide flux to the stitch pole 608, a configuration that is sometimes referred to as a pancake configuration. The stitch pole 608 provides the flux to the main pole 606. With this arrangement, the lower return pole may be optional. Insulation 616 surrounds the coils 610, and may provide support for the stitch pole 608 and main pole 606. The stitch pole may be recessed from the ABS 618. The direction of the media travel, as indicated by the arrow to the right of the structure, moves the media past the stitch pole 608, main pole 606, trailing shield 604 which may be connected to the wrap around shield (not shown), and finally past the upper return pole 602 (all of which may or may not have a portion in contact with the ABS 618). The ABS 618 is indicated across the right side of the structure. The trailing shield 604 may be in contact with the main pole 606 in some embodiments.

Figure 6B:
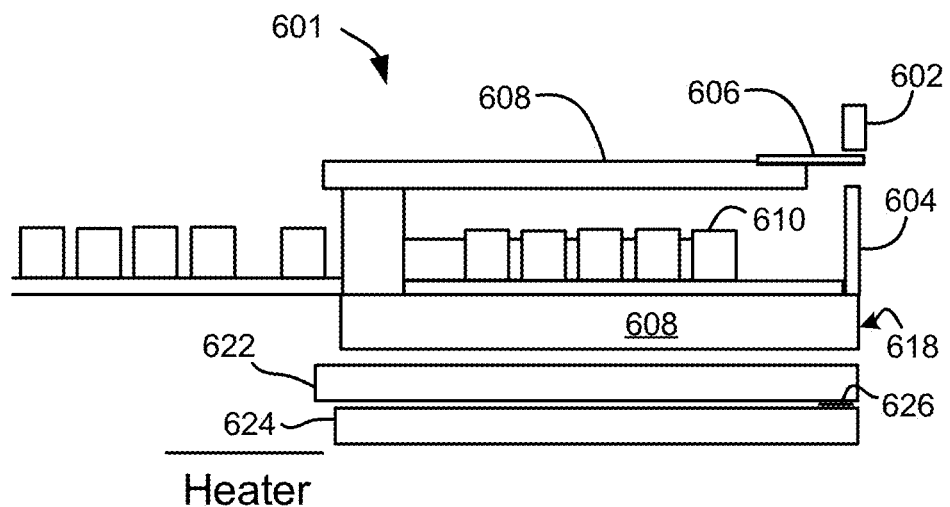
FIG. 6B is a partial cross-sectional view of a piggyback magnetic head with looped coils, in accordance with one embodiment of the present invention.

FIG. 6B illustrates another embodiment of a piggyback magnetic head 601 having similar features to the head 600 of FIG. 6A. As shown in FIG. 6B, the piggyback magnetic head 601 also includes a looped coil 610, which wraps around to form a pancake coil. Sensor shields 622, 624 are additionally shown. The sensor 626 is typically positioned between the sensor shields 622, 624.

In FIGS. 5B and 6B, an optional heater is shown near the non-ABS side of the magnetic head. A heater (Heater) may also be included in the magnetic heads shown in FIGS. 5A and 6A. The position of this heater may vary based on design parameters such as where the protrusion is desired, coefficients of thermal expansion of the surrounding layers, etc.

FIG. 7 provides a schematic diagram of a simplified perpendicular recording medium 700, which may also be used with magnetic disk recording systems, such as that shown in FIG. 4. As shown in FIG. 7, the perpendicular recording medium 700, which may be a recording disk in various approaches, comprises at least a supporting substrate 702 of a suitable non-magnetic material (e.g., glass, aluminum, etc.), and a soft magnetic underlayer 704 of a material having a high magnetic permeability positioned above the substrate 702. The perpendicular recording medium 700 also includes a magnetic recording layer 706 positioned above the soft magnetic underlayer 704, where the magnetic recording layer 706 preferably has a high coercivity relative to the soft magnetic underlayer 704. There may one or more additional layers (not shown), such as an "exchange-break" layer or "interlayer", between the soft magnetic underlayer 704 and the magnetic recording layer 706.

The orientation of magnetic impulses in the magnetic recording layer 706 is substantially perpendicular to the surface of the recording layer. The magnetization of the soft magnetic underlayer 704 is oriented in (or parallel to) the plane of the soft magnetic underlayer 704. As particularly shown in FIG. 7, the in-plane magnetization of the soft magnetic underlayer 704 may be represented by an arrow extending into the paper.

FIG. 8A illustrates the operative relationship between a perpendicular head 808 and the perpendicular recording medium 700 of FIG. 7. As shown in FIG. 8A, the magnetic flux 810, which extends between the main pole 812 and return pole 814 of the perpendicular head 808, loops into and out of the magnetic recording layer 706 and soft magnetic underlayer 704. The soft magnetic underlayer 704 helps focus the magnetic flux 810 from the perpendicular head 808 into the magnetic recording layer 706 in a direction generally perpendicular to the surface of the magnetic medium. Accordingly, the intense magnetic field generated between the perpendicular head 808 and the soft magnetic underlayer 704, enables information to be recorded in the magnetic recording layer 706. The magnetic flux is further channeled by the soft magnetic underlayer 704 back to the return pole 814 of the head 808.

As noted above, the magnetization of the soft magnetic underlayer 704 is oriented in (parallel to) the plane of the soft magnetic underlayer 704, and may represented by an arrow extending into the paper. However, as shown in FIG. 8A, this in plane magnetization of the soft magnetic underlayer 704 may rotate in regions that are exposed to the magnetic flux 810.

FIG. 8B illustrates one embodiment of the structure shown in FIG. 8A, where soft magnetic underlayers 704 and magnetic recording layers 706 are positioned on opposite sides of the substrate 702, along with suitable recording heads 808 positioned adjacent the outer surface of the magnetic recording layers 706, thereby allowing recording on each side of the medium.

Except as otherwise described herein with reference to the various inventive embodiments, the various components of the structures of FIGS. 1-8B, and of other embodiments disclosed herein, may be of conventional material(s), design, and/or fabricated using conventional techniques, as would become apparent to one skilled in the art upon reading the present disclosure.

Data scrubbing (e.g., disk scrubbing) is a common reliability, availability, and serviceability (RAS) feature among modern enterprise storage systems. Data scrubbing is part of the of the overall health monitor of the system and allows the system to detect potential failing disks and reduce the probability of silent data corruption. Data scrubbing includes amending and/or removing data in a database that may be incorrect, incomplete, improperly formatted, duplicated, etc. Conventional data scrubbing includes analyzing data using rules, algorithm, look-up tables, etc. Maintaining data integrity is a continuing goal in data storage system technology. Data scrubbing tools reduce the amount of accumulated errors and reduce the risk of uncorrectable errors which may lead to hardware and/or software failure.

A conventional disk scrub process includes ensuring that the read to a given logical block address (LBA) returns data without errors and verifies the integrity of the data returned. To minimize the performance impact, conventional disk scrub processes are lower priority background processes that traverse the LBA range of each and every magnetic disk in the system. The data may be verified based on the system Redundant Array of Independent Disks (RAID) configurations. RAID controllers may periodically read all hard disk drives in a RAID array and check for defective blocks before applications access the blocks.

Even as a lower priority task, the read operations by conventional scrubbing processes disturb the normal operations of servicing the external input/output (IOs). For example, the likelihood of a scrubbing read coinciding with the normal host read in the same region of the disk is very low. To service the scrubber read, the disk must position its magnetic head away from the host IO operation region and return to the region after providing data to the scrubber. The mechanical movements involved with moving between regions on the disk take significant time. Depending on the RAID configuration, data verification also takes significant computation power in addition to the computation power for normal external IO services. A conventional solution to reduce performance costs associated with data verification and data scrubbing is to reduce the scrubbing rate. Reducing the scrubbing rate is not efficient for protecting against silent data corruption.

Data verification for RAID1 includes block mirroring. After a host read operation, the checksum of another read from the block's mirror peer from the redundant disk is calculated. Data verification for RAID4 includes block striping with parity. After a host read, another read from the parity disk is performed and the data block is verified with the parity block. Data verification in RAID5 includes block striping with distributed parity. The striping starts from the same LBA on all disks (e.g., both the data and the parity). The parity distribution helps to position the magnetic head on all of the disks in the same region. The data scrubbing may take full advantage of the head positioning in reading the parity block and performing the data parity verification. RAID6 includes block striping with two distributed parities. Data verification in RAID6 is similar to RAID5.

In various embodiments of the present disclosure, every read from the disk is a scrub unit (SU) which comprises a read unit (RU). Controllers may determine a SU is a "segment" and the RU is a block where segments are read into memory for efficient data processing. Various embodiments provide that a certain amount of controller memory is set aside to buffer SUs for performance enhanced scrubbing. At least some embodiments comprise, in response to reading an SU that is not marked as being "scrubbed" in the scrub cycle, the remaining matching RAID SUs are marked "scrub-pending" by the controller. In response to determining that a future read is optimally located relative to a "scrub-pending" SU, the "scrub-pending" SU is read.

In various embodiments disclosed herein, "optimally located" reads refer to reads which are rotationally ahead of a present read and/or within a predetermined track threshold near the "scrub-pending" SU. Any predetermined threshold disclosed herein may be set by the user, a manufacturer, a content provider, a service provider, a default setting, an optimization algorithm, etc. Any value for a predetermined threshold may be stored and/or found in a look-up table.

Figure 9:
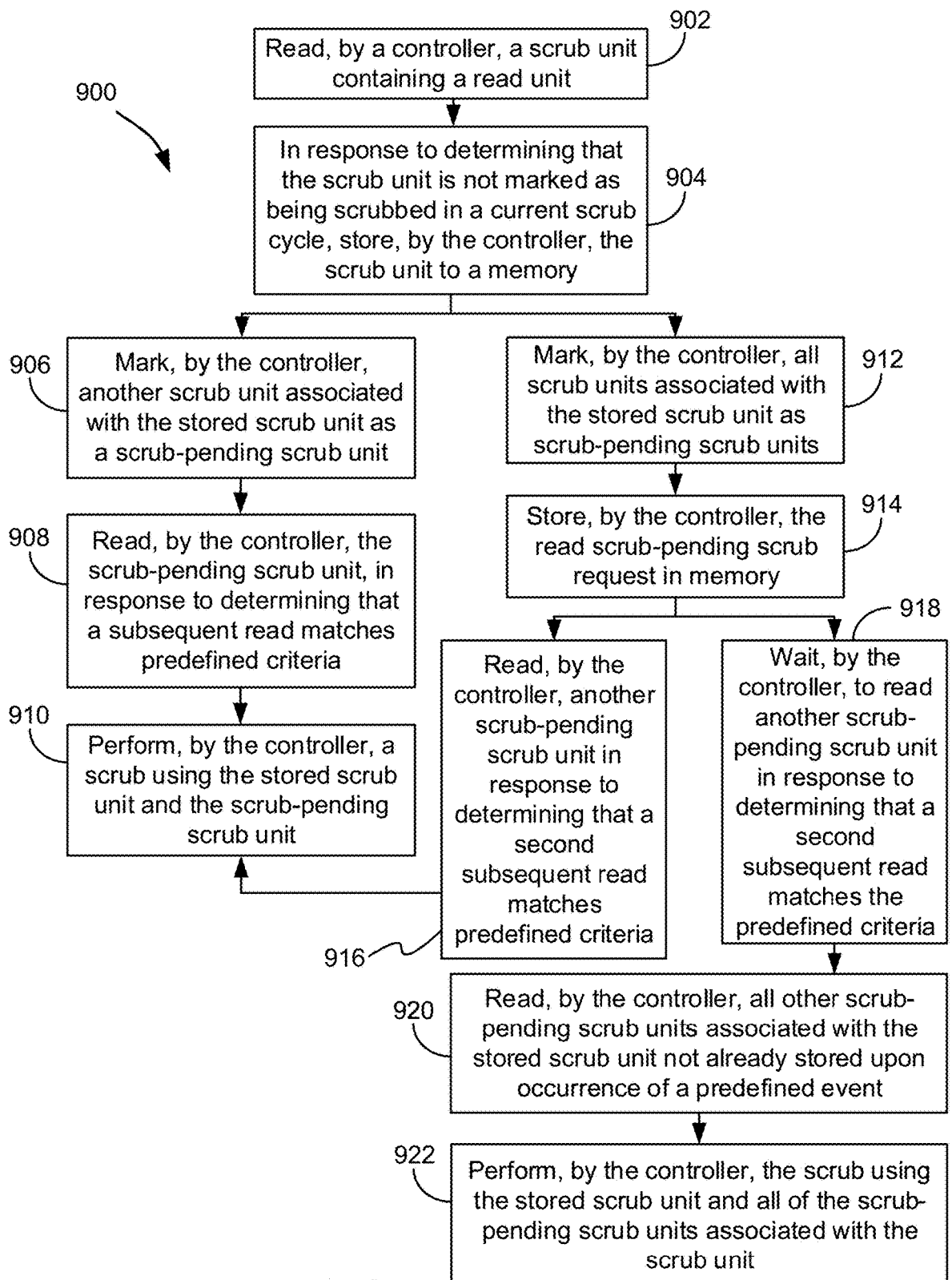
FIG. 9 is a flowchart of a method, in accordance with one embodiment of the present invention.

Now referring to FIG. 9, a flowchart of a method 900 is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by controllers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

In some approaches, the method 900 includes receiving, by a controller, a read request. A read request may be received in any manner known in the art.

As shown in FIG. 9, method 900 includes operation 902. Operation 902 comprises reading, by the controller, a scrub unit containing a read unit. In a preferred embodiment, the scrub unit comprising a read unit is requested by the read request from a hard disk. A SU may be one of a plurality of SUs that together are used to scrub the data in each scrub unit. For example, in RAID1, the SUs may be corresponding segments mirrored on multiple disks. In another example, in RAID4, the SU on the primary disk corresponds to a parity SU on a parity disk.

Operation 904 comprises, in response to determining that the scrub unit is not marked as being scrubbed in a current scrub cycle, storing by the controller, the scrub unit to a memory. A memory may be a Random Access Memory (RAM), a scrub buffer, Read Only Memory (ROM), Static Random Access Memory (SRAM), Dynamic Random Access Memory (DRAM), Programmable Read Only Memory (PROM), Erasable Programmable Read Only Memory (EPROM), Electrically Erasable Programmable Read Only Memory (EEPROM), etc. The scrub unit may be stored to the memory in any manner known in the art. In a preferred approach, the scrub unit may be stored to the memory in a table.

In one embodiment, method 900 proceeds to operation 906. Operation 906 comprises marking, by the controller, another scrub unit associated with the stored scrub unit as a scrub-pending scrub unit. The scrub unit associated with the stored scrub unit may be marked as a scrub-pending scrub unit in any manner known in the art. In a preferred embodiment, all other scrub units associated with the stored SU are marked. In one embodiment, at least some scrub units associated with the stored SU are marked and not all scrub units associated with the stored SU are marked. Scrub units which are associated with the stored scrub unit are scrub units which are in the same segment, region, track, sector, partition, etc., on the disk as would be understood by one having ordinary skill in the art upon reading the present disclosure. The scrub-pending scrub unit may be located on the same hard disk as the scrub unit containing the read unit in some embodiments. In one embodiment, the scrub-pending scrub unit is located on a different hard disk than the scrub unit containing the read unit.

Operation 908 comprises reading, by the controller, the scrub-pending scrub unit, in response to determining that a subsequent read matches predefined criteria. In a preferred embodiment, the scrub-pending unit is read, by the controller, from the scrub unit storage location. The storage location may be on the same hard disk, a different hard disk, etc.

In various embodiments, the predefined criteria includes the location of the data corresponding to the subsequent read being rotationally ahead of the scrub-pending scrub unit. In other approaches, the predefined criteria includes the subsequent read being within a predetermined time window relative to marking the scrub-pending scrub unit. In yet another approach, the predefined criteria includes the location of the data corresponding to the subsequent read being within a predetermined track threshold from the scrub-pending scrub unit. In a preferred embodiment, a predetermined track threshold may be between 10 and 15 tracks up and/or down from the scrub unit. Any predetermined criteria disclosed herein may be set by the user, a manufacturer, a content provider, a service provider, a default setting, an optimization algorithm, etc. Any value for a predetermined criteria may be stored and/or found in a look-up table.

Operation 910 comprises performing, by the controller, a scrub using the stored scrub unit and the scrub-pending scrub unit. In one embodiment, the scrub may be performed using the stored scrub unit and the scrub-pending scrub unit where there are only the two SUs. In other embodiments, the scrub may need more than two SUs. The scrub-pending SU is preferably stored in the memory until all the required SUs are gathered. The scrub may be performed in response to gathering all the SUs.

In another embodiment, method 900 proceeds from operation 904 to operation 912. Operation 912 comprises marking, by the controller, all scrub units associated with the stored scrub unit as scrub-pending scrub units. It should be understood by one having ordinary skill in the art that all scrub units associated with the stored scrub unit as scrub-pending scrub units may refer to all scrub units associated with the stored scrub unit as scrub-pending scrub units, less than all scrub units associated with the stored scrub unit as scrub-pending scrub units, at least some scrub units associated with the stored scrub unit as scrub-pending scrub units, etc. In one embodiment, operation 912 includes marking at least one additional scrub unit but not all scrub units associated with the stored scrub unit. Scrub units which are associated with the stored scrub unit are scrub units which are in the same segment, region, track, sector, partition, etc., on the disk as would be understood by one having ordinary skill in the art upon reading the present disclosure. In one embodiment, the scrub-pending scrub unit is located on a different hard disk than the scrub unit containing the read unit.

Operation 914 comprises storing the read scrub-pending scrub request in the memory. The memory may be a RAM, a scrub buffer, ROM, SRAM, DRAM, PROM, EPROM, EEPROM, etc.

In one embodiment, method 900 proceeds to operation 916. Operation 916 comprises reading, by the controller, another scrub-pending scrub unit in response to determining that a second subsequent read matches predefined criteria. In a preferred embodiment, the scrub-pending unit is read, by the controller, from its storage location. The storage location may be on the same hard disk, a different hard disk, etc. Any predetermined criteria disclosed herein may be set by the user, a manufacturer, a content provider, a service provider, a default setting, an optimization algorithm, etc. Any value for a predetermined criteria may be stored and/or found in a look-up table.

In various embodiments, the predefined criteria includes the location of the data corresponding to the subsequent read being rotationally ahead of the scrub-pending scrub unit. In other approaches, the predefined criteria includes the subsequent read being within a predetermined time window relative to marking the scrub-pending scrub unit. In yet another approach, the predefined criteria includes the location of the data corresponding to the subsequent read being within a predetermined track threshold from the scrub-pending scrub unit as described above.

In one embodiment, if all SUs are read and/or stored, the scrub may be performed. If there are more than three SUs needed to perform the scrub, then the additional scrub-pending SU is preferably stored in memory until all the required SUs are gathered. In response to gathering all the SUs, the scrub may be performed.

In another embodiment, method 900 proceeds from operation 914 to operation 918. Operation 918 comprises waiting, by the controller, to read another scrub-pending scrub unit in response to determining that a second subsequent read matches the predefined criteria. In various embodiments, the predefined criteria includes the location of the data corresponding to the subsequent read being rotationally ahead of the scrub-pending scrub unit. In other approaches, the predefined criteria includes the subsequent read being within a predetermined time window relative to marking the scrub-pending scrub unit. In yet another approach, the predefined criteria includes the location of the data corresponding to the subsequent read being within a predetermined track threshold from the scrub-pending scrub unit.

Operation 920 comprises reading, by the controller, all other scrub-pending scrub units associated with the stored scrub unit not already stored upon occurrence of a predefined event. In various embodiments, the predefined event includes passage of a predetermined amount of time since the scrub unit was saved. In another embodiment, the predefined event includes passage of a predetermined amount of time since any of the scrub units were saved. Any predetermined event disclosed herein may be set by the user, a manufacturer, a content provider, a service provider, a default setting, an optimization algorithm, etc. Any value associated with a predetermined event may be stored and/or found in a look-up table.

In another approach, the predefined event may include the memory reaching a predefined usage. A predefined usage may include memory reaching a predefined percentage of used space. Any value for the predefined usage may be determined by the user, the manufacturer, the content provider, the service provider, default settings, experimentally determined, etc. Any value for the predefined usage may be found and/or stored in a look-up table.

For example, the method 900 may be performed for a threshold amount of time and/or until the memory reaches the predefined usage. In response to occurrence of the predefined event, the scrub-pending units stored in the memory may be removed and the scrub process may proceed as normal as would be understood by one having ordinary skill in the art. The negative impact of the scrub process on normal operation performance may be delayed and/or reduced until the occurrence of the predefined event. Each scrub unit may be marked as scrubbed in response to performing the scrub process.

Operation 922 comprises performing, by the controller, the scrub using the stored scrub unit and all of the scrub-pending scrub units associated with the scrub unit. It should be understood by one having ordinary skill in the art that all scrub units associated with the stored scrub unit as scrub-pending scrub units may refer to all scrub units associated with the stored scrub unit as scrub-pending scrub units, less than all scrub units associated with the stored scrub unit as scrub-pending scrub units, at least some scrub units associated with the stored scrub unit as scrub-pending scrub units, etc. In one embodiment, operation 922 includes performing the scrub using the stored scrub unit and at least one additional scrub unit but not all scrub units associated with the stored scrub unit. The scrub may be performed in any manner known in the art. In one embodiment, the unrelated scrub units from several sets of associated scrub units are stored according to the method. The sets of associated scrub units requiring a least amount of additional reads to their scrub-pending scrub units are processed first. For example, read operations may be issued to complete the scrubbing of scrub-pending SUs starting with the SUs which require the least amount of additional read operations.

Various embodiments of the present disclosure significantly lessen the movement of the magnetic heads between normal read operations and read operations associated with the scrub process. This decrease in head movement decreases the performance impact of the scrub process and reduces wear and tear on the backend storage device.

In one example, a database is run on a front end of a disk and a scrub is run on the back end of the disk. Reads are performed on both the front end of the disk and the back end of disk which slow the overall performance of normal IO. For the scrub process, all the segments associated with the RAID rank must be read. For example, in RAID6, there may be 4+p+q segments to be read for the scrub process. In this exemplary embodiment, the scrub process in performed in an area on the disk where normal reading operations are not occurring. Normal read operations may read one segment without reading every data segment and/or parity segment in the RAID configuration for the scrub process. At least some of the operations disclosed herein include marking the read segment and marking the remaining segments to be read in a memory and reading the segments when optimally possible. If a segment is read during normal operation, the memory may be checked for marked segments which are optimally positioned. Optimally positioned marked segments may be read and the scrub may be performed once all the required segments are read.

In various embodiments, the method 900 may be optimal for disks with relatively low rotational speeds. For example, near line serial attached small computer system interface (NL SAS) disks are relatively dense but rotate at speeds of about 7200 RPM. Disks with relatively low rotational speeds may be optimized using various embodiments disclosed herein which reduce movement by the head between different regions on the relatively slow disks.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A controller-implemented method, comprising:
   reading, by a controller, a scrub unit containing a read unit;
   in response to determining that the scrub unit is not marked as being scrubbed in a current scrub cycle, storing, by the controller, the scrub unit to a memory;
   marking, by the controller, another scrub unit associated with the stored scrub unit as a scrub-pending scrub unit;
   reading, by the controller, the scrub-pending scrub unit in response to determining that a subsequent read matches predefined criteria, wherein the predefined criteria is selected from the group consisting of: the location of data corresponding to the subsequent read being rotationally ahead of the scrub-pending scrub unit, the subsequent read being within a predetermined time window relative to marking the scrub-pending scrub unit, and the location of the data corresponding to the subsequent read being within a predetermined track threshold from the scrub-pending scrub unit; and
   performing, by the controller, a scrub using the stored scrub unit and the scrub-pending scrub unit.

2. The controller-implemented method of claim 1, wherein the predefined criteria includes the location of the data corresponding to the subsequent read being rotationally ahead of the scrub-pending scrub unit.

3. The controller-implemented method of claim 1, wherein the predefined criteria includes the subsequent read being within the predetermined time window relative to marking the scrub-pending scrub unit.

4. The controller-implemented method of claim 1, wherein the predefined criteria includes the location of the data corresponding to the subsequent read being within the predetermined track threshold from the scrub-pending scrub unit.

5. The controller-implemented method of claim 1, wherein the scrub-pending scrub unit is located on a different hard disk than the scrub unit containing the read unit.

6. The controller-implemented method of claim 1, comprising:
   marking, by the controller, all scrub units associated with the stored scrub unit as scrub-pending scrub units;
   storing, by the controller, a read scrub-pending scrub request in memory; and
   reading, by the controller, another scrub-pending scrub unit in response to determining that a second subsequent read matches predefined criteria.

7. The controller-implemented method of claim 1, comprising:
   marking, by the controller, all scrub units associated with the stored scrub unit as scrub-pending scrub units;

storing, by the controller, a read scrub-pending scrub request in the memory;

waiting, by the controller, to read another scrub-pending scrub unit in response to determining that a second subsequent read matches predefined criteria;

reading, by the controller, all other scrub-pending scrub units associated with the stored scrub unit not already stored upon occurrence of a predefined event; and performing, by the controller, the scrub using the stored scrub unit and all of the scrub-pending scrub units associated with the stored scrub unit.

8. The controller-implemented method of claim 7, wherein the predefined event includes passage of a predetermined amount of time since the scrub unit was saved.

9. The controller-implemented method of claim 7, wherein the predefined event includes the memory reaching a predefined usage.

10. The controller-implemented method of claim 7, wherein unrelated scrub units from several sets of associated scrub units are stored according to the method, wherein sets of associated scrub units requiring a least amount of additional reads to gather their scrub-pending scrub units are processed first.

11. A system, comprising:
a processor; and
logic integrated with the processor, executable by the processor, or integrated with and executable by the processor, the logic being configured to:
read a scrub unit containing a read unit;
in response to determining that the scrub unit is not marked as being scrubbed in a current scrub cycle, store the scrub unit to a memory;
mark another scrub unit associated with the stored scrub unit as a scrub-pending scrub unit;
read the scrub-pending scrub unit, in response to determining that a subsequent read matches predefined criteria, wherein the predefined criteria is selected from the group consisting of: the location of data corresponding to the subsequent read being rotationally ahead of the scrub-pending scrub unit, the subsequent read being within a predetermined time window relative to marking the scrub-pending scrub unit, and the location of the data corresponding to the subsequent read being within a predetermined track threshold from the scrub-pending scrub unit; and
perform a scrub using the scrub unit and the scrub-pending scrub unit.

12. The system of claim 11, wherein the predefined criteria includes the location of the data corresponding to the subsequent read being rotationally ahead of the scrub-pending scrub unit.

13. The system of claim 11, wherein the predefined criteria includes the subsequent read being within the predetermined time window relative to marking the scrub-pending scrub unit.

14. The system of claim 11, wherein the predefined criteria includes the location of the data corresponding to the subsequent read being within the predetermined track threshold from the scrub-pending scrub unit.

15. The system of claim 11, wherein the scrub-pending scrub unit is located on a different hard disk than the scrub unit containing the read unit.

16. The system of claim 11, comprising logic configured to:
mark all scrub units associated with the stored scrub unit as scrub-pending scrub units;
store a read scrub-pending scrub request in memory; and
read another scrub-pending scrub unit in response to determining that a second subsequent read matches predefined criteria.

17. The system of claim 11, comprising logic configured to:
mark all scrub units associated with the stored scrub unit as scrub-pending scrub units;
store a read scrub-pending scrub request in memory;
wait to read another scrub-pending scrub unit in response to determining that a second subsequent read matches predefined criteria;
read all other scrub-pending scrub units associated with the stored scrub unit not already stored upon occurrence of a predefined event; and
perform the scrub using the stored scrub unit and all of the scrub-pending scrub units associated with the stored scrub unit.

18. The system of claim 11, wherein the predefined event is selected from the group consisting of: passage of a predetermined amount of time since the scrub unit was saved and the memory reaching a predefined usage.

19. The system of claim 17, wherein unrelated scrub units from several sets of associated scrub units are stored according to the method, wherein sets of associated scrub units requiring a least amount of additional reads to gather their scrub-pending scrub units are processed first.

20. A computer program product for data scrubbing, the computer program product comprising a computer readable storage medium having program instructions embodied therewith, the program instructions executable by a computer to cause the computer to:
read, by the computer, a scrub unit containing a read unit;
in response to determining that the scrub unit is not marked as being scrubbed in a current scrub cycle, store, by the computer, the scrub unit to a memory;
mark, by the computer, another scrub unit associated with the stored scrub unit as a scrub-pending scrub unit;
read, by the computer, the scrub-pending scrub unit, in response to determining that a subsequent read matches predefined criteria, wherein the predefined criteria is selected from the group consisting of: the location of data corresponding to the subsequent read being rotationally ahead of the scrub-pending scrub unit, the subsequent read being within a predetermined time window relative to marking the scrub-pending scrub unit, and the location of the data corresponding to the subsequent read being within a predetermined track threshold from the scrub-pending scrub unit; and
perform, by the computer, a scrub using the stored scrub unit and the scrub-pending scrub unit.

* * * * *